INVENTOR
ROBERT A. SCHULTZ
By Donald G. Dalton
Attorney

Jan. 29, 1963 R. A. SCHULTZ 3,075,422
STRIP CLAMPING AND CAM MECHANISMS FOR A STRIP SAMPLING PUNCH
Filed July 24, 1959 8 Sheets-Sheet 3

INVENTOR
ROBERT A. SCHULTZ
By Donald G. Dalton
Attorney

Jan. 29, 1963 R. A. SCHULTZ 3,075,422
STRIP CLAMPING AND CAM MECHANISMS FOR A STRIP SAMPLING PUNCH
Filed July 24, 1959 8 Sheets-Sheet 8

FIG. 17
FIG. 18

INVENTOR
ROBERT A. SCHULTZ
By Donald G. Dalton
Attorney

United States Patent Office 3,075,422
Patented Jan. 29, 1963

3,075,422
STRIP CLAMPING AND CAM MECHANISMS FOR A STRIP SAMPLING PUNCH
Robert A. Schultz, Pittsburgh, Pa., assignor to United States Steel Corporation, a corporation of New Jersey
Filed July 24, 1959, Ser. No. 829,380
20 Claims. (Cl. 83—319)

This invention relates to apparatus for punching samples from continuously travelling metal strip and more particularly to cam operated mechanism for effecting the strip punching operation.

It relates more particularly to a strip sampling apparatus of the type covered by the co-pending application of Alfred Teplitz, Serial No. 827,387, filed July 15, 1959.

Quality-control in the manufacture of tin plate as well as other sheet metal strip products requires that samples be taken frequently for testing in the mill metallurgical laboratories. If the product is sheared into sheets, sampling is easily accomplished by periodically removing sheets from the conveyor belt following the shear. However, if the product is produced in coil form, samples can be readily obtained only from the ends of the coil and such samples, moreover, may not be accurately representative of the product in other portions of the coil. For the purpose of quality control it is highly desirable that samples should be taken from the strip at points other than its ends. Stopping of the line to obtain samples from the body of the coil is impractical since this would interfere with the strip processing operation and render portions of the strip, for example, those portions in plating tanks during the stoppage, of unsuitable quality.

The above mentioned application of Alfred Teplitz discloses an apparatus that operates to take samples from strip as it travels through a processing line and which does not require stoppage or slowing of the strip movement. In a preferred embodiment of such apparatus, the strip has its movement guided over a vertical path that extends through a punch carriage, which is mounted for gravitational acceleration along said path from an elevated position. The desired sample is removed from the strip by a punch and die that are arranged on opposite sides of the strip and are mounted on the punch carriage for movement between retracted and punching positions relative to each other and the strip. Before operation of the punch to remove a sample, the downward travel of the punch carriage must be synchronized with the speed at which the strip is travelling, and the apparatus mentioned above employs mechanisms for this purpose that form the subject-matter respectively of my co-pending application, Serial No. 829,379, filed July 24, 1959.

As indicated, one of the principal objects of this invention is to providen a strip punching mechanism that can be operated to remove a sample from the strip in a short period of time after synchronization of its movement with the speed of strip travel, and a camming mechanism for effecting its operation. Other objects and advantages of the invention will become apparent from the following description and the accompanying drawings in which:

The strip punching apparatus shown in FIGURES 1–5, generally stated, comprises a punch-frame assembly 1 which is mounted for vertical movement with respect to a frame 2, a hoist unit 3 that controls the raising and lowering movements of the assembly 1, and a pair of camming units 4 which form a part of this invention and are respectively arranged in the path of vertical movement of opposite ends of the assembly 1 for operating it to effect a strip punching operation. The strip S travels continuously over guide rolls 5, 6 and 7 and moves downwardly over a vertical path between the guide rolls 6 and 7 that extends through the punch assembly 1. To effect a strip punching operation, the hoist unit 3 is operated to elevate the punch-frame assembly 1 from its lowered position, shown in FIGURES 1 and 2, to its elevated position, shown in FIGURE 3, where it is released for gravitational downward movement in the direction of strip travel between the guide rolls 6 and 7. As the assembly 1 moves downwardly, the camming units 4 operate punch and die devices, which in a manner to be described form part of the assembly 1 and are respectively positioned on opposite sides of the strip S to effect a strip punching operation.

Figure 1:
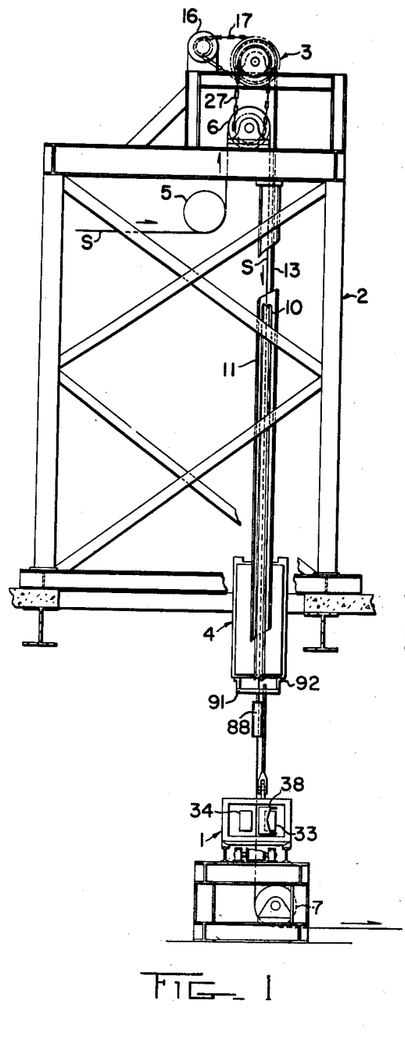
FIGURE 1 is an elevational view of a strip sampling apparatus constructed in accordance with the principles of this invention.
Figure 2:
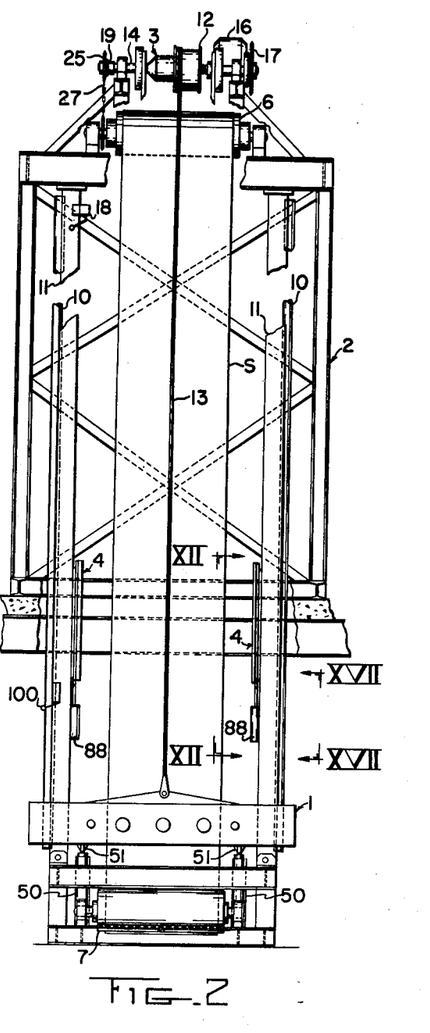
FIGURE 2 is an elevational view looking from the right of FIGURE 1.
Figure 8:
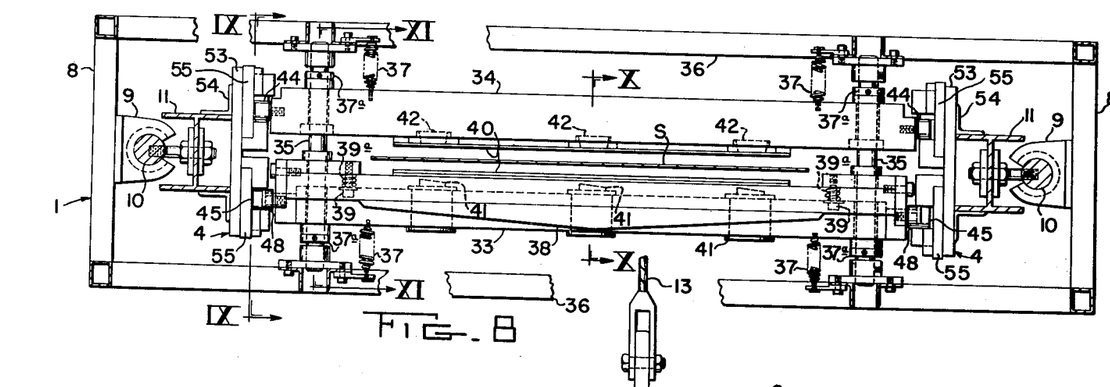
FIGURE 8 is an enlarged plan view showing the punch-frame assembly in a vertical position above the camming units that effect a strip punching operation thereof, and which is taken looking in the direction of the line VIII—VIII of FIGURE 3.

The assembly 1, in accordance with the principles of this invention and as best shown in FIGURE 8, comprises a carriage in the form of a rectangular frame 8 which has its vertical movement guided by guide collars 9 extending inwardly from opposite ends thereof. The collars 9 have sliding engagement on vertical guide rods 10 that have bolted connections with vertical standards 11, which, as best shown in FIGURE 2, are arranged along opposite edges of the vertical path of movement of the strip S and form part of the frame 2. The camming units 4 are secured in facing relation along the inner sides of the standards 11.

As indicated above, raising and lowering movement of the frame assembly 1 is controlled by the hoist unit 3, which includes (see FIGURE 3) a winding drum 12 for a hoist cable 13 connected at its lower end to the punch-frame carrage 8. The drum 12 is mounted for rotation by a shaft 14 which is supported in bearings 15 and is driven by an electric hoist motor 16 through a sprocket chain drive 17. Upon operation of the motor 16, the drum 12 is rotated to wind the cable 13 thereon and raise the punch-frame assembly 1 to the elevated position shown in FIGURE 3. As the assembly 1 moves into this position, a limit switch 18, which controls rotation of the drum 12 by the shaft 14, is actuated to discontinue the upward movement of the assembly 1 and release it for gravitational movement downwardly over the guide rods 10. The hoist unit 3 further includes mechanism providing for axial cable threading movement of the drum 12 to maintain the cable 13 centered with respect to the assembly 1 which forms the subject matter of my co-pending application, Serial No. 837,418, filed September 1, 1959, and to which reference is made for a detailed description thereof. While the drum 12 in the preferred construction of the unit 3 is connected and released with respect to the drive shaft 14 through magnetic clutches (not shown), the drive shaft 14 can be regarded for the purpose of this invention as being continuous through the bearings 15 and the drum 12 as having a keyed connection thereto such that raising and lowering movement of the assembly 1 is controlled by the energized condition of the motor 16. In this respect, it will be understood that the limit switch 18 can be regarded as controlling the energization of the motor 16 and, more particularly, as operating to de-energize it to release the drum 12 for a gravitational lowering movement of the assembly 1.

Figure 6:
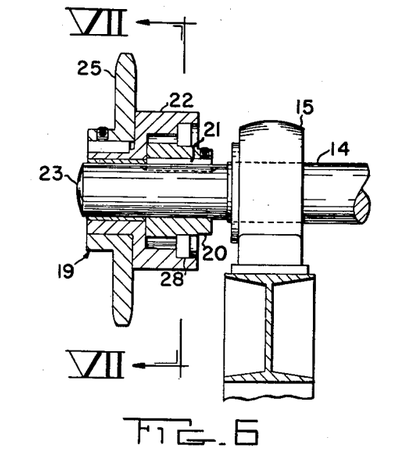
FIGURE 6 is a fragmentary vertical sectional view showing somewhat diagrammatically an over-running clutch that forms part of the drive for controlling the vertical movement of the punch-frame assembly shown in the preceding figures.
Figure 7:
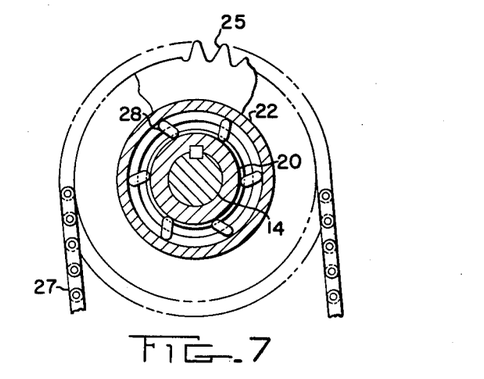
FIGURE 7 is a fragmentary sectional view taken substantially in the plane of the line VII—VII of FIGURE 6.

In order that the strip will not be torn or mutilated when the punching operation is effected, the assembly 1 must have a downward speed, when it is opposite the camming units 4 and a strip punching operation is effected thereby, that exactly matches the speed of travel of the strip S. Synchronization of the speed of movement of the assembly 1 and the strip S is essential in order that there will be no relative vertical movement between the strip and the punch and die parts of the assembly 1 when they operate to punch a sample from the strip S. The speed synchronization for this purpose is, according to the invention covered by my co-pending application, Serial No. 829,379, preferably accomplished through a drive that includes an over-running clutch 19 which forms part of the hoist unit 3. The clutch 19 is conventional and is illustrated somewhat diagrammatically in FIGURES 6 and 7 of the drawings as comprising an inner race 20 connected by a key 21 to the shaft 14, and an outer race 22 supported for rotation on the outer end 23 of the shaft 14. The outer race 22 is rotated continuously in a counterclockwise direction, as viewed in FIGURE 7, by a chain and sprocket drive which includes a sprocket 25 keyed to the outer race 22, a sprocket 26 connected with the strip guide roll 6 for rotation therewith, and a sprocket-chain 27 connecting the sprockets 25 and 26. Since the guide roll 6 has frictional engagement with the strip S and is thus driven at a speed corresponding to the linear speed of strip movement, the outer race 22 is continuously driven at a rotational speed corresponding to the linear speed of strip travel. The over-running feature of the clutch 19 is provided by clutch wedges or sprags 28 between the inner race 20 and the outer race 22 which operate to prevent rotation of the inner race 20 in a counterclockwise direction, as viewed in FIGURE 7, at a rotational speed greater than the rotational speed of the outer race 22. In this manner, the over-running clutch 19 provides for unrestricted relative rotation of the inner race 20 and shaft 14 in a clockwise direction, as viewed in FIGURE 7, to permit elevation of the frame assembly 1, and to permit its downward acceleration by gravity to a speed corresponding to the speed of strip travel. When the assembly and strip speeds are matched, the clutch sprags 28 operate to lock the inner race 20 to the outer race 22 and prevent the inner race 20 from over-running the outer race 22 so that further increase in the speed of downward movement of the assembly 1 is prevented. For this purpose, the unit 3 must be constructed to provide for locking operation of the sprags 28 at the instant when the strip speed and the peripheral speed of the drum 12 are the same. The vertical elevation from which the assembly 1 is dropped by actuation of the limit switch 18 must be sufficiently high that the assembly 1 is accelerated to a speed matching the strip speed prior to its movement to the level of the camming units 4. When the assembly 1 reaches the speed at which the strip S is travelling, the clutch 19 operates through the sprags 28 as explained to prevent further increase in speed of the assembly 1.

From the foregoing it will be apparent that the synchronizing drive acting through the over-running clutch 19 operates to synchronize the downward movement of the assembly 1 with the strip S, and that this is accomplished at different speeds of strip travel. In this respect, it will be noted that for slow speeds of strip movement the sprags 28 operate to lock the inner and outer races 20 and 22 aganst relative movement at an early point in the downward movement of the assembly 1, while for higher strip speeds the sprags 28 operate at a later point in the downward movement of the assembly 1. Attention is particularly directed to the fact that the speed synchronizing action of the clutch 19 enables a stationary location of the limit switch 18 so that the punch-frame assembly 1 is released for downward movement at a fixed elevation for all speeds of strip travel, and the switch 18 may thus be attached to one of the standards 11 in the position shown in FIGURE 2.

Figure 9:
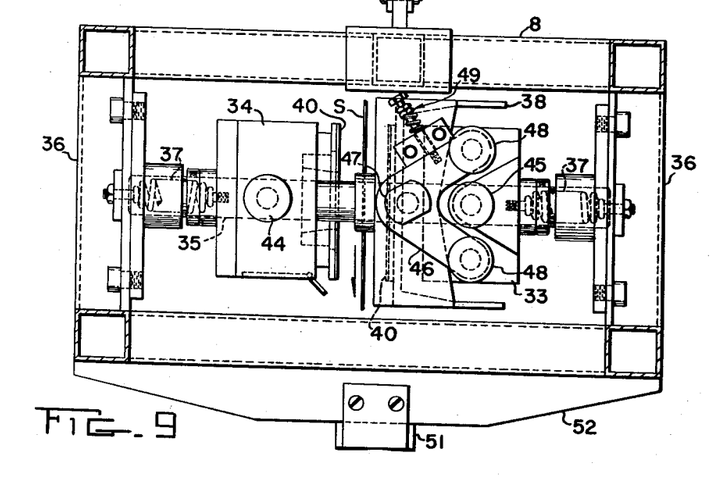
FIGURE 9 is an enlarged view taken along the line IX—IX of FIGURE 8 which shows the operating parts of the punch-frame assembly in end elevation.
Figure 10:
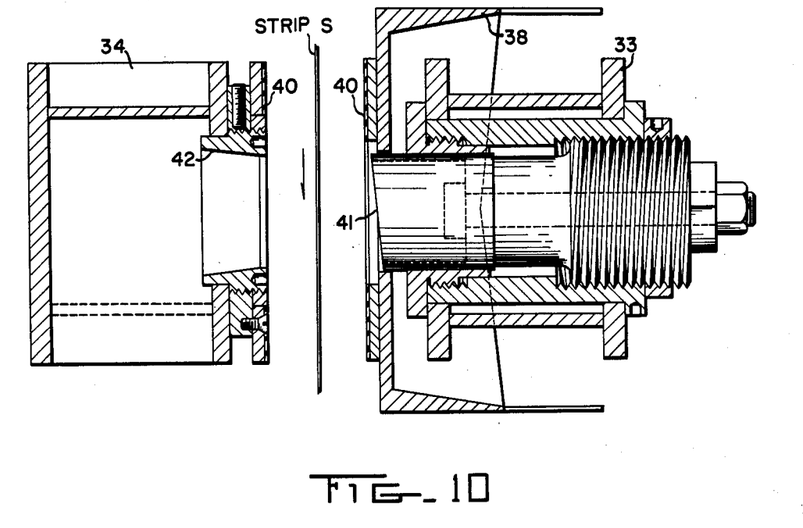
FIGURES 10 and 11 are enlarged sectional views respectively taken along the lines X—X and XI—XI of FIGURE 8.
Figure 11:
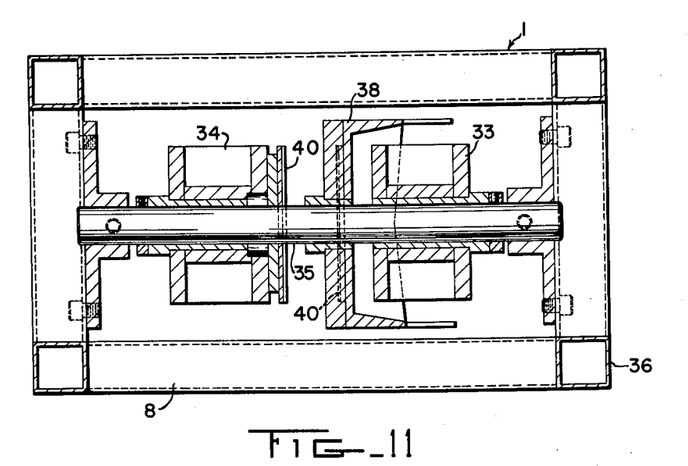

The punch-frame assembly 1, as indicated, has punch and die parts on opposite sides of the strip S for punching samples therefrom. For this purpose, and as shown in FIGURES 8-11, such punch and die parts comprise a punch-frame 33 and a die-frame 34 respectively arranged on opposite sides of the strip S. A pair of rods 35 extending transversely of opposite sides 36 of the assembly 1 support the frames 33 and 34 for rectilinear sliding movement in a direction normal to the path of strip travel to and from a strip punching position relative to each other. Each of the frames 33 and 34 is held by a pair of coil springs 37 (shown diagrammatically in FIGURE 8) against stop collars 37a on the shafts 35. In addition, a stripper-frame 38 is mounted for rectilinear sliding movement on the rods 35 in a position between the punch-frame 33 and the strip S as best shown in FIGURES 10 and 11. A pair of stop bolts 39 limits the movement of the stripper-frame relative to the punch-frame 33 in a direction toward the die-frame 34 as viewed in FIGURE 8, and a pair of coil springs 39a (see FIGURE 8) biases the movement of the stripper-frame 38 on the rods 35 in a drection away from the punch-frame 33 and toward the strip S to the limited position determined by the stop bolts 39. A pair of clamping plates 40 are respectively mounted in facing relation on the stripper-frame 38 and die-frame 34 for clamping engagement with the strip S in a manner to be described. The punch-frame 33 mounts a plurality of punches 41 for movement through aligned openings in cooperating dies 42 on the die-frame 34 and in the clamping plates 40. Upon movement of the frames 33 and 34 toward each other in a manner to be described, the clamping plates 40 first move into clamping engagement with the strip S and immediately thereafter the punches 41 enter the dies 42 to punch samples from the strip S. The frames 33 and 34 are preferably provided with three sets of punches 41 and dies 42 so that on each punching operation three samples, respectively at the center and opposite edges of the strip, are obtained.

Punching movement of the frames 33 and 34 toward each other as described above is effected by cam followers at opposite ends of the frames 33, 34 and 38 which are actuated by the camming units 4 of this invention. For this purpose, the cam followers are cam rollers 44 on opposite ends of the die-frame 34, and similar cam rollers 45 on opposite ends of the punch-frame 33. The mechanism for operating the stripper-frame 38 comprises a pair of bell-crank assemblies secured to opposite ends thereof which respectively comprise a bell-crank 46 having a central pivotal connection 47 to an end of the frame 38 and a pair of cam followers or rollers 48 rottatably supported on the outer ends of the arms of the bell-crank 46. As best shown in FIGURE 9, a spring assembly 49 biases each of the bell-cranks 46 to a position in which the cam rollers 48 thereof are aligned vertically relative to the cam roller 45 on the punch-frame 33. The cam rollers 48 however (see FIGURE 8) are spaced axially inwardly relative to the punch-frame cam rolls 45 for a purpose to be described.

In operation, the stripper-frame 38 and die-frame 34 are actuated to move the clamping plates 40 into clamping engagement with the strip S in advance of actuation of the punch-frame 33. The clamping action of the plates 40 is thus effective to prevent relative movement between the strip S and the punch-frame assembly 1 at the time the punches 41 are operated to remove samples from the strip S. In this manner the clamping plates 40 prevent relative movement of the strip S with respect to the punch-frame assembly 1 if their relative speeds of movement are not exactly synchronized at the time when the assembly 1 moves through the camming units 4 and the strip punching operation is performed.

A pair of shock absorbers 50 supported on the base of frame 2 stop the downward movement of the carriage 1 when it reaches the position shown in FIGURE 2. The shock absorbers 50 are engaged by a pair of bumpers 61 which are secured to bracing members 52 extending transversely between the sides of the carriage 3 as shown in FIGURE 9.

Figure 13:
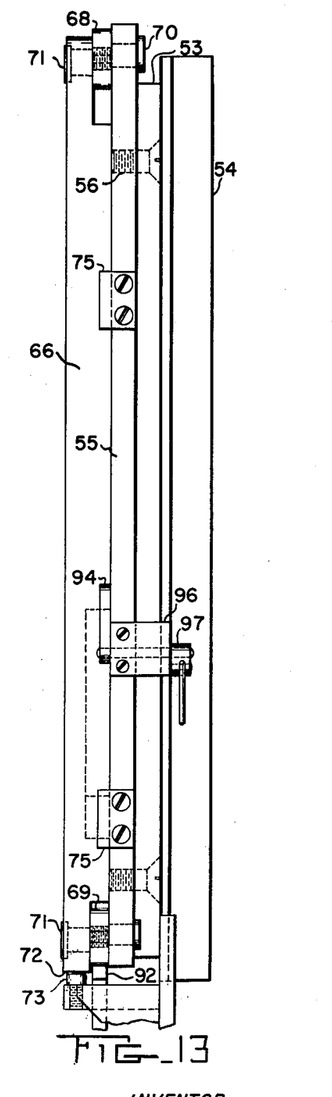
FIGURE 13 is a side elevation of the camming unit shown in FIGURE 12.
Figure 14:
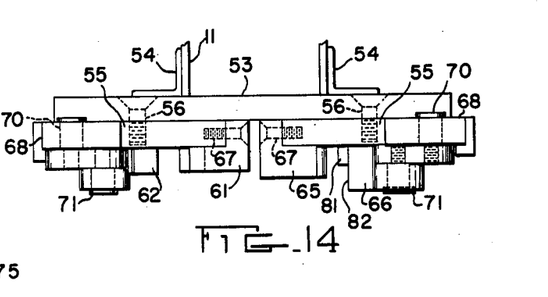
FIGURE 14 is a plan view of the camming unit shown in FIGURE 12.

It will be recalled that the camming units 4 are attached to the vertical standards 11 in facing relation relative to each other. For this purpose, and as shown in FIGURES 8 and 14, each of the units 4 includes a back plate 53 which is secured by a pair of angles 54 to one of the frame standards 11. The units 4 have an identical construction which, as shown in FIGURES 12–15, includes a pair of mounting plates 55 secured in laterally spaced relation to the back plate 53. While the mounting plates 55 preferably have an adjustable support on the back plate 53 in order to provide for adjustment of the position of camming mechanism (to be described) mounted thereon, they may be regarded for the purposes of this invention as being rigidly attached to the back plate 53, for example, by threaded fasteners 56.

Figure 3:
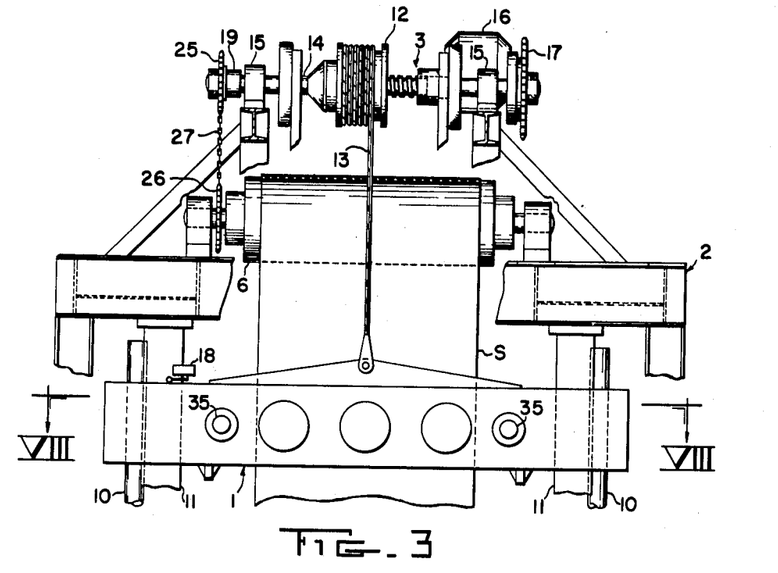
FIGURE 3 is an enlarged fragmentary elevational view of a portion of the apparatus shown in FIGURE 2 which shows the punch-frame assembly thereof in an elevated position.
Figure 4:
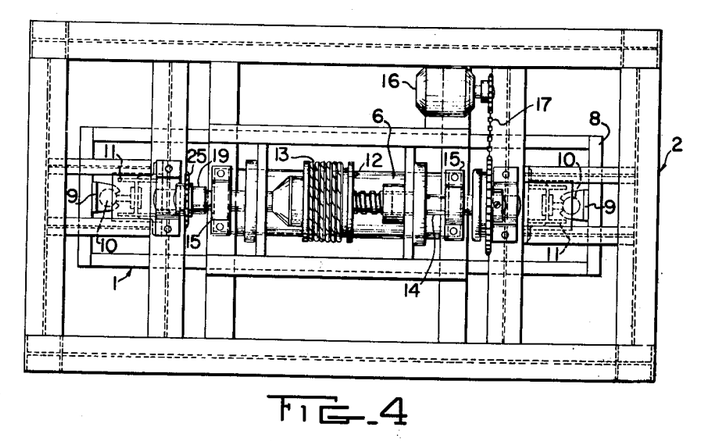
FIGURE 4 is a plan view of the structure shown in FIGURE 3.
Figure 5:
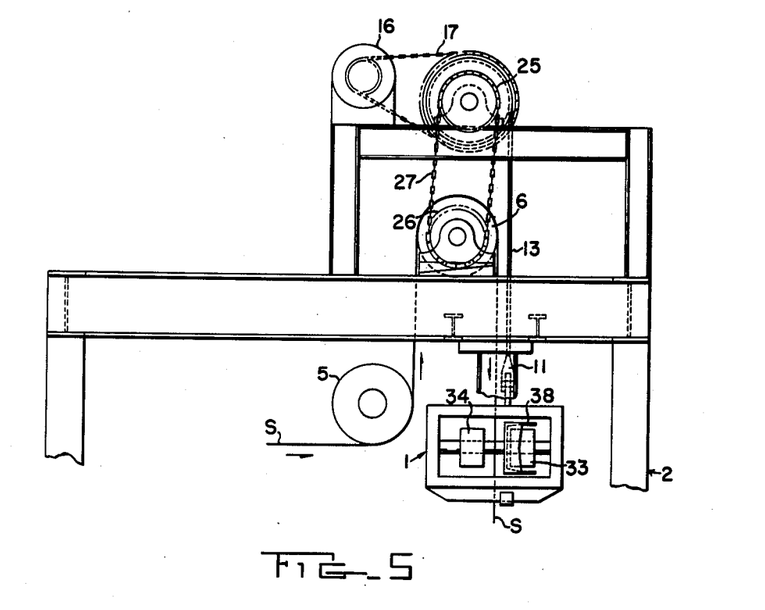
FIGURE 5 is an elevational view looking from the left of FIGURE 3.
Figure 12:
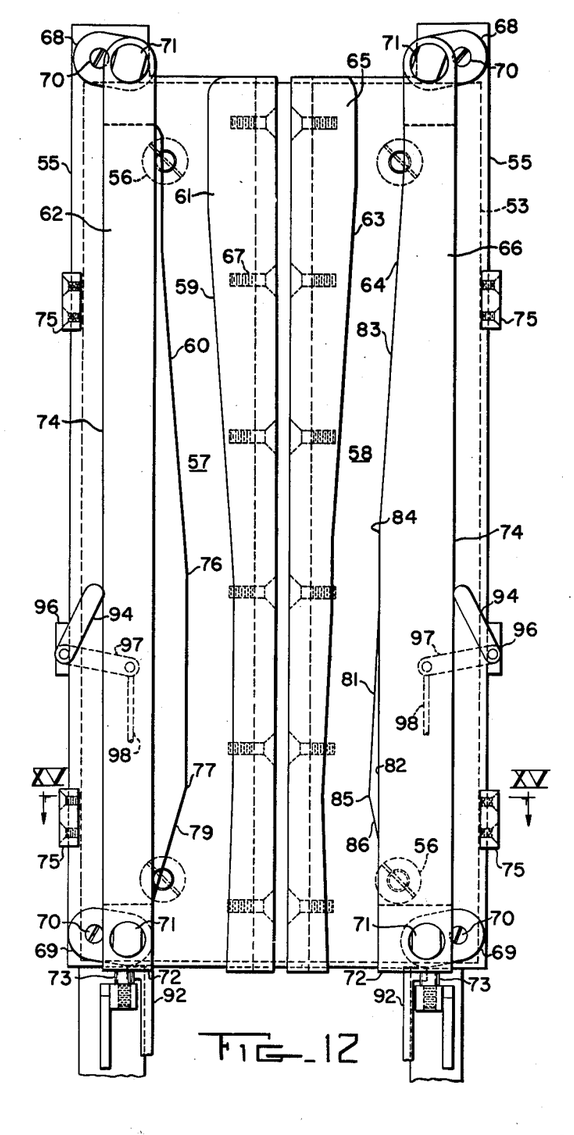
FIGURE 12 is an elevation of one of the camming units looking in the direction of the line XII—XII of FIGURE 2.
Figure 15:
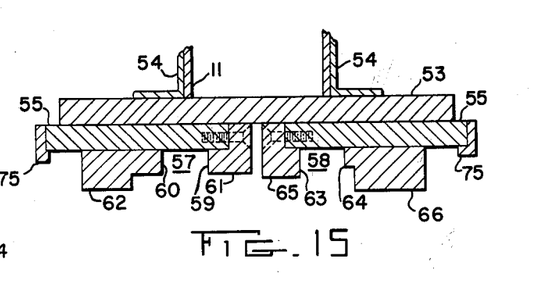
FIGURE 15 is a sectional view taken along the line XV—XV thereof.

The camming mechanism supported on the mounting plates 55 provides a pair of vertically extending cam slots 57 and 58, as best shown in FIGURE 12, through which the cam rollers 44, 45 and 48 travel as the punch-frame assembly 1 moves downwardly from the drop position shown in FIGURE 3 to the position shown in FIGURE 2. The cam slot 57 is defined by facing surfaces 59 and 60 respectively on a vertically extending bar 61 secured to one of the mounting plates 55 and a cam bar 62 mounted for sliding movement over the face thereof. The other cam slot 58 is similarly defined by facing surfaces 63 and 64 respectively on a vertically extending bar 65 secured to the other mounting plate 55 and a cam bar 66 mounted for sliding movement over the face thereof. The bars 61 and 65 have an L-shaped configuration as best shown in FIGURES 14 and 15 and are rigidly secured to adjacent edges of the plates 55 by threaded fasteners 67. The mountings of the movable bars 62 and 66 are identical and as best shown in FIGURES 12 and 13 respectively comprise a pair of upper and lower parallel links 68 and 69, the bars 62 and 66 having recesses on their back surfaces to provide space in which the links 68 and 69 are received. The outer ends of each of the links 68 and 69 are connected by pivots 70 to the mounting plates 55, and their inner ends are connected by pivots 71 to the bars 62 and 66, the upper links 68 being connected to the upper ends of the bars 62 and 66, and the lower links 69 being connected to the lower ends thereof.

Figure 16:
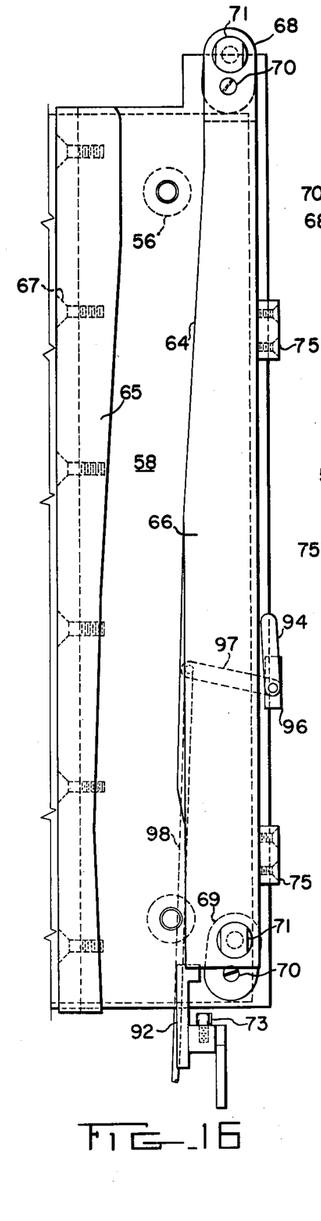
FIGURE 16 is a fragmentary elevational view similar to FIGURE 12 of a portion of the camming unit but showing the operating parts thereof in a different position.

FIGURE 12 shows the bars 62 and 66 in their lowered and operative positions in which their respective camming surfaces 60 and 64 cooperate with the stationary camming surfaces 59 and 63 to form the cam slots 57 and 58 for a purpose to be described. FIGURE 16 shows the bar 66 in its retracted position to which it is moved when the assembly 1 is to be elevated to the position shown in FIGURE 3 for a purpose to be described. Both of the bars 62 and 66 are moved simultaneously to and from their operating and retracting positions by the mechanism (to be described) shown in FIGURES 17 and 18. In the operating position of the bars 62 and 66 shown in FIGURES 12 and 13, their lower ends 72 engage stationary stop pins 73. In their retracted positions, their outer edges 74 as shown in FIGURE 16 move into abutting engagement with stops 75 secured to the outer edges of the mounting plates 55.

The cam slots 57 provide passageways through which the cam rollers 44 at the ends of the die-frame 34 travel during upward and downward movement of the assembly 1 relative to the camming units 4. Upon downward movement through the slots 57, the rollers 44 have camming engagement with the vertically inclined upper portions of the camming surfaces 60 which operate to cam the die-frame 34 from the retracted position shown in FIGURE 8 to a position in which its clamping plate 40 has engagement with the strip S. The frame 34 is held in this position while the rollers 44 move downwardly over the vertical portions of the camming surfaces 60 between the points 76 and 77. Below the points 77, the surfaces 79 have a reverse inclination that provides for retracting movement of the die-frame 34, which is effected by the camming action of the lower end portions of the surfaces 59 that are opposite and below the points 77, and by the biasing springs 37.

The cam slots 58 similarly provide passageways through which the punch-frame rollers 45 and the stripper-frame rollers 48 travel during upward and downward movement of the punch-frame assembly 1. In order to provide for inward punching movement of the punch-frame 33 relative to the stripper-frame 38, each cam surface 64 has a portion 81 adjacent its lower end which is spaced inwardly (see FIGURE 14) with respect to the portion 82 thereof to provide for independent actuation of the cam rollers 45 and 48, which it will be recalled are spaced axially relative to each other. During downward movement of the assembly 1, the punch-frame rollers 45 move over the surfaces 81 while the stripper-frame rollers 48 move over the surfaces 82. During initial downward movement over the inclined upper portions 83 of the cam surfaces 64, the stripper-frame rollers 48 and the punch-frame rollers 45 are both cammed inwardly to move the punch-frame 33 and the stripper-frame 38 toward the strip S. As its downward movement continues the stripper-frame 38 is cammed to a position in which its clamping plate 40 has clamping engagement with the strip S when both of its rollers 48 have engagement with the portions 82, which are vertical, of the camming surfaces 64, and at this point the cam-rollers 44 of the die-frame 34 will be opposite the points 76 so that both clamping plates 40 will have tight clamping engagement with the strip S, which will thus be held against relative movement with respect to the frames 33 and 34 during a subsequent punching operation of the punch-frame 33. Attention is directed to the fact that each bell-crank lever 46 has a pivotal movement as the rollers 48 at the outer ends of its arms move over the points 84 at the upper ends of the vertical portions 82 of the camming surfaces 64. The bell-crank levers 46 thus provide for application of the camming force to the stripper-frame 38 at a central point when it is operated to move its clamping plate 40 into engagement with the strip S. As downward movement of the assembly 1 is continued, the punch-frame rollers 45 move over the inclined camming surfaces 81 and operate to move the punch-frame 33 inwardly to force the punches 41 into the dies 42 and thus punch samples from the strip S while it is held between the clamping plates 40. The punching throw of the frame 33 is completed slightly before the rollers 45 move to a position opposite the points 85, but this involves only a small travel of the punches 41 in the nature of 1/16 inch. The surfaces 86 below the points 85 have a severse inclination to provide for retracting movement of the frame 33 by its biasing springs 37, which movement is effected initially by the camming action of the inclined lower end portions of the surfaces 63 that are opposite and below the points 85. While initial retracting movement of the punch-frame is taking place in this manner, engagement of the stripper-frame rollers 48 with the vertical camming surfaces 82 is maintained to hold the stripper-frame 38 against outward movement with the punch-frame 33. In this manner, the punches 41 are stripped from the strip S by the action of the stripper-frame 38 operating through its clamping plate 40 to hold the strip S against outward movement with the punches 41.

Figures 17, 18:
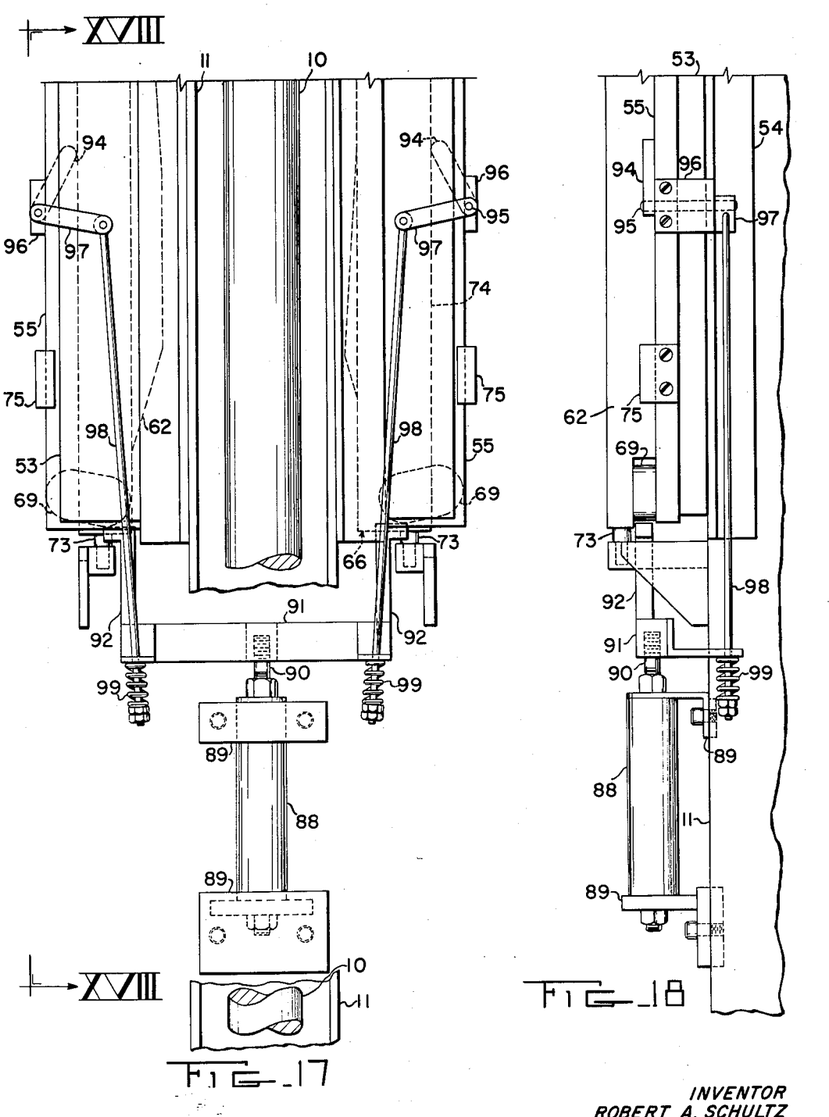
FIGURE 17 is a fragmentary elevational view looking in the direction of the line XVII—XVII of FIGURE 2 which shows the air-cylinder operated mechanism that controls the operating positions of the movable parts of one of the camming units.
FIGURE 18 is an elevation looking from the left of FIGURE 17.

As indicated, FIGURE 12 shows the operating positions of the cam bars 62 and 66 relative to the stationary cam bars 61 and 65, and FIGURE 16 illustrates the retracted position of the bar 66 relative to the stationary cam bar 65. When the cam bar 66 is retracted as shown in FIGURE 16, the other cam bar 62 occupies a similar retracted position. In the retracted positions of the cam bars 62 and 66, their camming surfaces 60 and 64 are arranged outwardly relative to the camming surfaces on the stationary bars 61 and 65, and occupy positions in which they are inoperative to effect a strip-punching operation of the assembly 1 during upward movement to the position shown in FIGURE 3. As shown in FIGURES 17 and 18 the mechanism for moving the cam bars 62 and 66 to and from their operating and retracted positions comprises a double-acting reversible air cylinder or motor 88 which is supported on the vertical standards 11 by brackets 89. The motor 88 includes a vertically extending piston rod 90 connected at its upper end to a horizontally extending yoke 91 that has a pair of cam operating members 92 projecting upwardly from opposite ends thereof. The upper ends of the members 92 have abutting engagement with the pivot links 69 so that they are effective, when moved upwardly by the motor 88 from the retracted position shown in FIGURES 17 and 18, to move the cam bars 62 and 66 upwardly from the position shown in FIGURE 12. By reason of the pivotal mounting provided by the parallel links 68 and 69 upward movement of the cam bars 62 and 66 in this manner results in their movement to the retracted position in FIGURE 16.

In order that retracting or return movement of the piston rod 90 by the motor 88 will be effective to lower the cam bars 62 and 66 to their respective operating positions shown in FIGURE 12, the yoke 91 is connected with the cam bars 62 and 66 through a link system which includes a pair of links 94 that resiliently biases their respective movements. Each of the links 94 has abutting engagement at its upper end with the outer edge 74 of one of the cam bars 62 or 66 as shown in FIGURE 12 and has its lower end keyed to a pin 95 rotatably supported in a bearing block 96 secured to the outer edge of a mounting plate 55. The pivotal movement of each pin 95 and biasing link 94 is controlled by a lever 97 which extends inwardly over the back of the mounting plate 53 and has one end keyed to the pivot pin 95 and its other end pivotally connected to a vertically extending operating rod 98. The rods 98 extend downwardly through openings in the piston connected yoke 91 and have springs 99 on their lower ends which bias their movement downwardly with respect to the yoke 91 to thereby maintain the outer ends of the links 94 engaged with the edges 74 of the cam bars 62 and 66. In this manner, the springs 99 provide a resilient bias that operates through the links 94 to move the cam bars 62 and 66 inwardly toward the operating position shown in FIGURE 12.

When the yoke 91 and piston 90 move to the retracted position shown in FIGURES 17 and 18, the links 94 engage and move the cam bars 62 and 66 to the operating position shown in FIGURE 12. Upon operation of the motor 88 to move the piston rod 90 and yoke 91 upwardly, the members 92 as described above operate to pivot the lower links 69 and to move the cam bars 62 and 66 to their retracted positions. As the cam bars 62 and 66 move outwardly to their retracted positions, the links 94 are pivoted outwardly relative to each other as viewed in FIGURE 17 and thus operate to rotate the levers 97 to the position shown in dotted lines in FIGURE 16, and this carries the rods 98 upwardly with the yoke 91 so that tension on the springs 99 is maintained. Upon reverse operation of the motor 88 to return the piston 90 and yoke 91 to the position shown in FIGURE 17, the yoke 91 moves downwardly and compresses the biasing springs 99, which operate to move the rods 98 downwardly. Downward movement of the rods 98 in this manner is effective through the levers 97 and pins 95 to pivot the links 94 in opposite rotational directions and toward each other to thereby move the cam bars 62 and 66 inwardly to the operating positions thereof shown in FIGURE 12.

As indicated, the motor 88 is a double-acting air cylinder and is controlled by a solenoid-actuated reversing valve (not shown), which in turn is controlled by the upper limit switch 18 and a lower limit switch 100 (see FIGURE 2) mounted on one of the standards 11 at a vertical level just below the camming units 4 and in the path of movement of the assembly 1 for operation thereby. Since solenoid operated reversing valves and control circuits therefore are conventional, the reversing valve circuit controlling the operation of the motor 88 has not been shown in the drawings, and it will be sufficient to indicate that such circuit is under the control of the limit switches 18 and 100. The limit switch 100 operates upon downward movement of the assembly 1 to effect operation of the motor 88 in one direction to move the yoke 91 upwardly and thereby move the cam bars 62 and 66 to their retracted positions. When the hoist unit 3 is thereafter energized to elevate the assembly 1, the cam bars 62 and 66 are in their retracted positions and the cam follower rolls 44, 45 and 48 move upwardly through the cam slots 57 and 58 without effecting a strip punching operation of the punch-dies 41 and 42. When the assembly 1 moves into the upper position shown in FIGURE 3, the limit switch 18 operates to release the assembly 1 for downward gravitational movement as described above. In addition, the limit switch 18 includes contacts in the control circuit for the motor 88 which are effective upon operation thereof to effect a reverse operation of the motor 88 to return the cam bars 62 and 66 to their operative camming positions shown in FIGURE 12. The control circuit for the motor 16 preferably provides for release of the assembly 1 for lowering movement only after the cam bars 62 and 66 are returned to their operating positions as shown in FIGURE 12, and this may be accomplished by interlock contacts (not shown) which are actuated when the bars 62 and 66 engage the stop pins 72. As the assembly 1 gravitates downwardly, its cam follower rolls move through the cam slots 57 and 58 and effect a strip-punching operation of the punch 41 and die 42 as described above.

While the carriage 8 of the punch-frame assembly 1 is mounted for vertical movement in the preferred embodiment of the invention as described above, and thus utilizes gravity for accelerating its speed to the speed of strip movement, it will be understood that the principles of this invention are applicable to modifications in which, for example, the punch-frame carriage 8 is mounted for horizontal movement and has a power drive for accelerating its speed to the speed of strip travel.

While one embodiment of my invention has been shown and described it will be apparent that other adaptations and modifications may be made without departing from the scope of the following claims.

I claim:

1. In a punching apparatus for taking samples from strip travelling continuously over a rectilinear path, the combination comprising a carriage mounted for movement in opposite directions along said path, a punch and a die respectively disposed on opposite sides of said path of strip travel and mounted on said carriage for movement between retracted and punching positions relative to said strip, said punch and die normally occupying a retracted position on said carriage, and means controlling the movement of said punch and die between their said retracted and punching positions comprising a pair of cam followers on said carriage having actuating connections respectively with said punch and said die, a pair of operating cams, means mounting each of said cams for movement from an operative position in which it is in the path of movement of one of said followers to an inoperative position out of the path of movement thereof, said cams being adapted through said followers to actuate said punch and die to their said strip punching position upon movement of said carriage in one of said directions, and means operating independently of the movement of said carriage for moving said cams to their said inoperative position during movement of said carriage in an opposite direction.

2. In a punching apparatus for taking samples from strip travelling continuously over a rectilinear path, the combination comprising a pair of guides respectively arranged outwardly of and parallel to the edges of strip moving over said path, a carriage having engagement at its ends with said guides for sliding movement in opposite directions along said path, a pair of frames respectively disposed on opposite sides of said strip and extending longitudinally of said carriage and parallel to said strip, means mounting each of said frames on said carriage for movement therewith and for movement relative thereto in a direction transversely of said path of strip travel, a punch on one of said frames and a die on the other of said frames, and operating means for moving said frames to actuate said punch and die to and from a strip punching position relative to each other comprising cam followers on opposite ends of each of said frames, and a pair of camming units respectively mounted in stationary locations along said guides at opposite ends of said carriage, each of said camming units having a pair of laterally displaced cam slots through which the said cam followers on the ends of said frames travel upon movement of said carriage along said guides and are actuated to move said frames and thereby said punch and die to and from a strip punching position relative to each other.

3. A strip punching apparatus as defined in claim 2 characterized by said frames being movable toward each other from a retracted position on said carriage to a strip punching position, and a plurality of springs biasing the movement of said frames to said retracted position.

4. A strip punching apparatus as defined in claim 3 characterized by means rendering said camming units effective to move said frames from their said retracted position to perform a strip punching operation in one direction of movement of said carriage and ineffective in the opposite direction of movement thereof.

5. A strip punching apparatus as defined in claim 2 characterized by each of said camming units comprising a stationary support, a pair of laterally spaced cam bars respectively extending along and defining one edge of each of its said cam slots, and means mounting said cam bars for movement from a normal position in which they are effective through said cam followers to impart a strip punching operation to said frames to a retracted position respectively displaced outwardly relative to each other, said cam bars when in their said retracted position operating to enlarge said cam slots so that said cam followers may travel therethrough without imparting a strip punching operation to said frames.

6. A strip punching apparatus as defined in claim 5 characterized by the provision of means for moving said cam bars simultaneously to their said retracted position.

7. In an apparatus for punching samples from strip travelling continuously over a rectilinear path, the combination comprising a carriage mounted for guided movement in opposite directions along said path, a pair of punch frames respectively disposed on opposite sides of said path of strip travel and mounted on said carriage for movement transversely of said path between a retracted position and a strip punching position, said frames normally occupying said retracted position and being movable relatively toward each other to said strip punching position, and camming means for actuating said frames to said strip punching position comprising a pair of stationary plates respectively arranged in facing relation at opposite ends of said carriage and extending transversely of its path of movement, two pairs of spaced parallel cam bars on the facing sides of each of said plates respectively cooperating to define a cam slot therebetween, means rigidly securing the adjacent cam bars in each of said pairs to said plates and means mounting the remote cam bars thereof for movement from an operative camming position to a retracted position spaced a greater distance from said rigidly secured cam bars, and cam followers on the ends of said frames movable through said cam slots upon movement of said carriage along said path, said movable cam bars occupying said operative camming position and being effective through said followers to cam said punch frames to their said strip punching position upon movement of said carriage along said path in one of said opposite directions, and means for moving said remote cam bars to their said retracted position enlarging said cam slots and permitting movement of said cam followers therethrough without imparting a cammed movement to said punch frames during return movement of said carriage in an opposite direction along said path.

8. A strip punching apparatus as defined in claim 7 characterized by said mounting means for each of said remote cam bars comprising a pair of parallel links having pivotal connections at opposite ends thereof with one of said mounting plates and with one of said remote cam bars.

9. A strip punching apparatus as defined in claim 8 characterized by cam bar moving means comprising an actuating yoke having parts engaged with the ends of the remote cam bars in each of said pairs, and means for actuating said yokes to impart an endwise movement to the cam bars engaged thereby and to thereby pivot their mounting links on said stationary plates and move said cam bars to their said retracted position.

10. A strip punching apparatus as defined in claim 9 characterized by means biasing the movement of each of said remote cam bars to their operative camming position comprising a spring biased linkage system including a pivoted link engaged with the outer edge of each of said remote cam bars.

11. In punching apparatus for taking samples from strip travelling continuously over a vertical path, a carriage mounted for gravitational downward movement along said path, a hoist for moving said carriage upwardly along said path, a strip punching mechanism mounted on said carriage for movement therewith and including a pair of punch frames respectively disposed on opposite sides of said path of strip travel and mounted on said carriage for movement in relative directions toward each other from a retracted position to a strip punching position, said frames normally occupying said retracted position on said carriage, and means for actuating said frames from said retracted position to said strip punching position comprising cam followers on the ends of each of said frames, cam actuators normally occupying an operative camming position in the path of movement of said cam followers during downward gravitational movement of said carriage for engaging said cam followers and actuating said frames to said strip punching position, means supporting said cam actuators for movement to a retracted position out of the path of movement of said cam followers, and means operating independently of the movement of said carriage for moving said cam actuators to and holding them in said retracted position during upward movement of said carriage by said hoist.

12. A strip punching apparatus as defined in claim 11 characterized by a linkage system including springs resiliently biasing the movement of each of said cam actuators to its said operative camming position.

13. In punching apparatus for taking samples from strip travelling continuously over a rectilinear path, a carriage mounted for movement along said path, a strip punching mechanism mounted on said carriage for movement therewith and including a punch frame and a die frame respectively disposed on opposite sides of said path of strip travel and mounted on said carriage for movement in relative directions toward each other from a retracted position to a strip punching position, said frames normally occupying said retracted position on said carriage, a strip clamping plate on said die frame for movement thereby into clamping engagement with the strip, a clamping frame arranged between said punch frame and the strip, a clamping plate on said clamping frame for movement thereby into clamping engagement with the strip, and means actuating said frames comprising cam strip, and means actuating said frames comprising cam followers on the opposite ends of each of said punch and die frames, a pair of bell cranklevers respectively having pivotal connections with opposite ends of said clamping frame and a pair of cam followers on the outer ends of the bell crank arms thereof, said clamping frame normally occupying a retracted position on said carriage adjacent said punch frame in which said pairs of cam followers are arranged in positions on opposite sides of and aligned with the cam followers on the ends of said punch frame, and means including cam actuators in the path of movement of said cam followers during movement of said carriage in one direction along said path for engaging said cam followers to actuate said frames, said cam actuators operating initially to actuate said die frame and clamping frame to positions with the clamping plates thereon in clamping engagement with the strip and thereafter to actuate said punch frame from its said retracted position to a strip punching position relative to said die frame.

14. In punching apparatus for taking samples from strip travelling continuously over a rectilinear path, a carriage mounted for movement along said path, a strip punching mechanism mounted on said carriage for movement therewith and including a punch frame and a die frame respectively disposed on opposite sides of said path of strip travel and mounted on said carriage for movement in relative directions toward each other from a retracted position to a strip punching position, said frames normally occupying said retracted position on said carriage, a strip clamping plate on said die frame for movement thereby into clamping engagement with the strip, a clamping frame arranged between said punch frame and the strip, a clamping plate on said clamping frame for movement thereby into clamping engagement with the strip, and means actuating said frames comprising cam followers on the opposite ends of each of said punch and die frames, a pair of bell crank levers respectively having pivotal connections with opposite ends of said clamping frame and a pair of cam followers on the outer ends of the bell crank arms thereof, said clamping frame normally occupying a retracted position on said carriage adjacent said punch frame in which said pairs of cam followers are arranged in positions on opposite sides of and aligned with the cam followers on the ends of said punch frame, and means including a pair of camming units respectively mounted in stationary locations at opposite ends of said carriage and in path of movement of said cam followers, each of said camming units having a pair of laterally displaced cam slots through which said cam followers travel upon movement of said carriage in one direction along said path, said cam slots operating initially to actuate said die frame and clamping frame to positions with the clamping plates thereon in clamping engagement with the strip and thereafter to actuate said punch frame from its said retracted position to a strip punching position relative to said die frame.

15. A strip punching apparatus as defined in claim 14 characterized by each of said camming units comprising movable cam bars normally occupying a position in which they define said cam slots, and means for moving said cam bars to positions enlarging and rendering said cam slots ineffective to impart movement to said frames during upward movement of said carriage in an opposite direction along said path.

16. In punching apparatus for taking samples from strip travelling continuously over a rectilinear path, a carriage mounted for movement along said path, a strip punching mechanism mounted on said carriage for movement therewith and including a punch frame and a die frame respectively disposed on opposite sides of said path of strip travel and mounted on said carriage for movement in relative directions toward each other from a retracted position to a strip punching position, said frames normally occupying said retracted position on said carriage, a strip clamping plate on said die frame for movement thereby into clamping engagement with the strip, a clamping frame arranged between said punch frame and the strip, a clamping plate on said clamping frame for movement thereby into clamping engagement with the strip, and means actuating said frames comprising cam followers on the opposite ends of each of said punch, die, and clamping frames, said clamping frame normally occupying a retracted position on said carriage adjacent said punch frame, and means including a pair of camming units respectively mounted in stationary locations at opposite ends of said carriage and in the path of movement of said cam followers, each of said camming units having a pair of laterally displaced cam slots through which said cam followers travel upon movement of said carriage in one direction along said path, said cam slots operating initially to actuate said die frame and clamping frame to positions with the clamping plates thereon in clamping engagement with the strip and thereafter to actuate said punch frame from its said retracted position to a strip punching position relative to said die frame.

17. In a punching apparatus for taking samples from strip travelling continuously over a rectilinear path, the combination comprising a carriage mounted for movement in opposite directions along said path, a pair of frames respectively disposed on opposite sides of said path of strip travel, means mounting each of said frames on said carriage for movement therewith and for movement relative thereto in a direction transversely of said path of strip travel, a punch on one of said frames and a die on the other of said frames, and operating means for moving said frames to actuate said punch and die to and from a strip punching position relative to each other comprising a pair of cam followers having actuating connections respectively with said frames, a pair of operating cams, means mounting each of said cams for movement from an operative position in which it is in the path of movement of one of said followers to an inoperative position out of the path of movement thereof, said cams being adapted through said followers to actuate said punch and die to their said strip punching position upon movement of said carriage in one of said directions, and means operating independently of the movement of said carriage for moving said cams to their said inoperative position during movement of said carriage in an opposite direction.

18. A strip punching apparatus as defined in claim 16 characterized by said punch frame and die frame respectively having a punch and a die mounted thereon, and by said clamping plates having aligned openings through which said punch moves into and out of said die upon movement of said punch frame to and from its said punching position.

19. A strip punching apparatus as defined in claim 18 characterized by said cam slots operating after actuation of said punch frame to its said strip punching position to withdraw said punch frame to said retracted position and thereby withdraw said punch through said clamping plate openings, said clamping plates operating as stripper plates to hold said strip against movement with said punch during movement of said punch frame to its said retracted position.

20. A strip punching apparatus as defined in claim 19 characterized further by means cooperating with said cam slots operating finally to actuate said die frame and clamping frame to withdrawn positions in which said clamping plates are out of clamping engagement with the strip.

References Cited in the file of this patent
UNITED STATES PATENTS

| | | |
|---|---|---|
| 1,878,520 | Hughes | Sept. 20, 1932 |
| 2,350,975 | Rodder et al. | June 6, 1944 |
| 2,484,854 | Peters | Oct. 18, 1949 |
| 2,519,159 | Talbot | Aug. 15, 1950 |
| 2,737,703 | Van Clief | Mar. 13, 1956 |
| 2,854,077 | Novak et al. | Sept. 30, 1958 |
| 2,930,269 | Kennedy | Mar. 29, 1960 |